G. SALLES.
BOAT SALVAGE DEVICE.
APPLICATION FILED FEB. 1, 1908.
922,519.
Patented May 25, 1909.
12 SHEETS—SHEET 1.
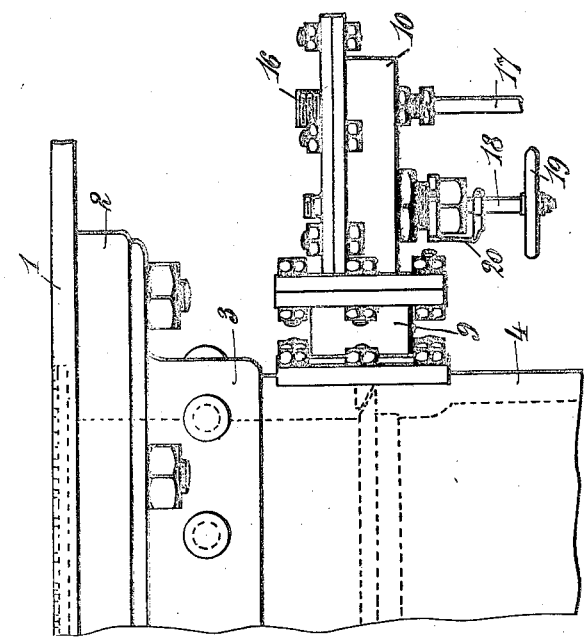
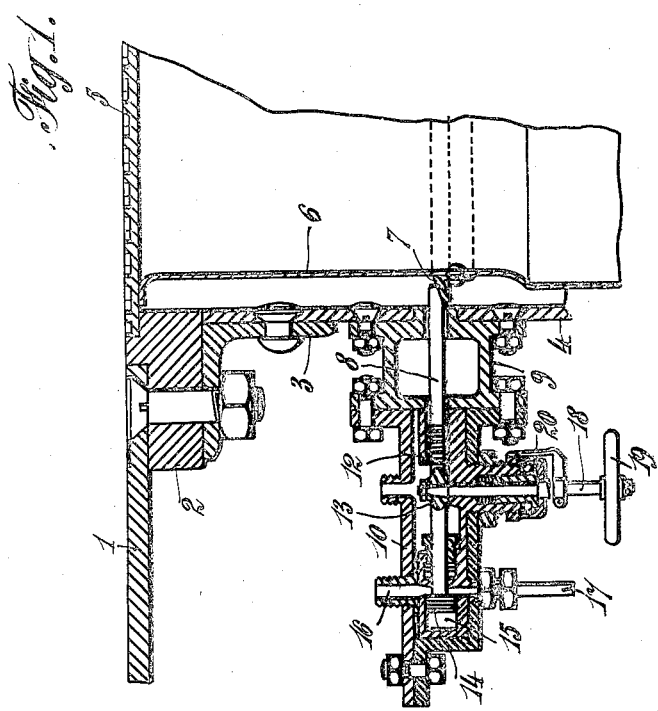
Witnesses
C. M. Boulter.
H. K. Boulter.
Inventor
Gustave Salles.
By Wm. E. Boulter,
Attorney

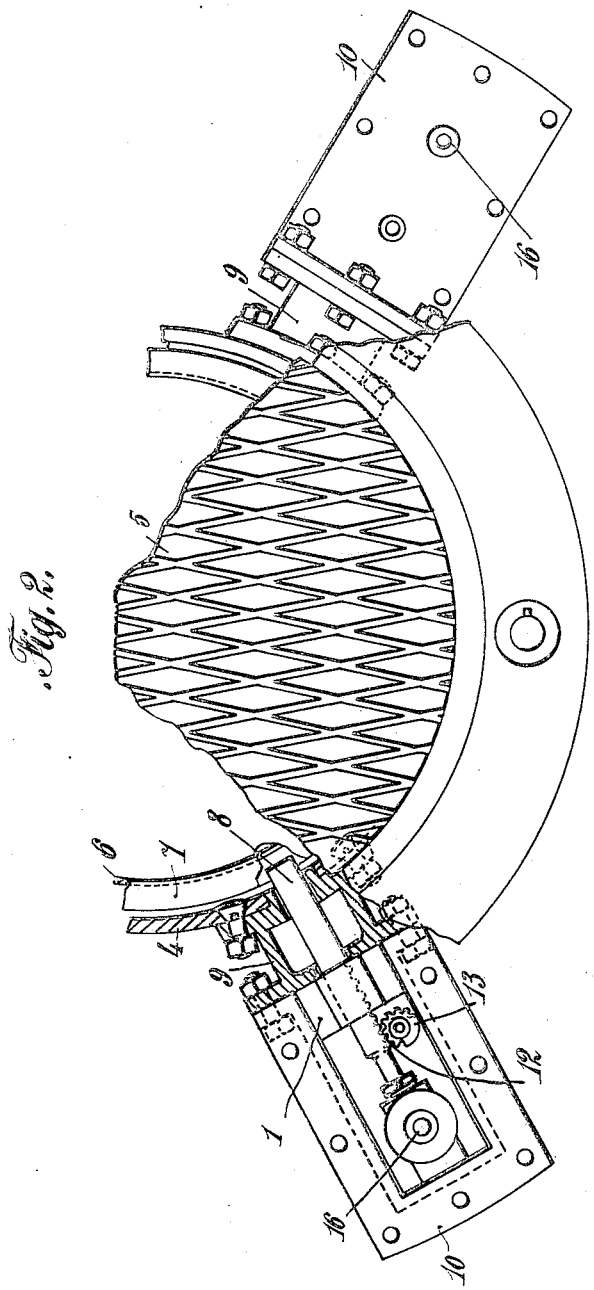

G. SALLES.
BOAT SALVAGE DEVICE.
APPLICATION FILED FEB. 1, 1908.
922,519.
Patented May 25, 1909.
12 SHEETS—SHEET 3.
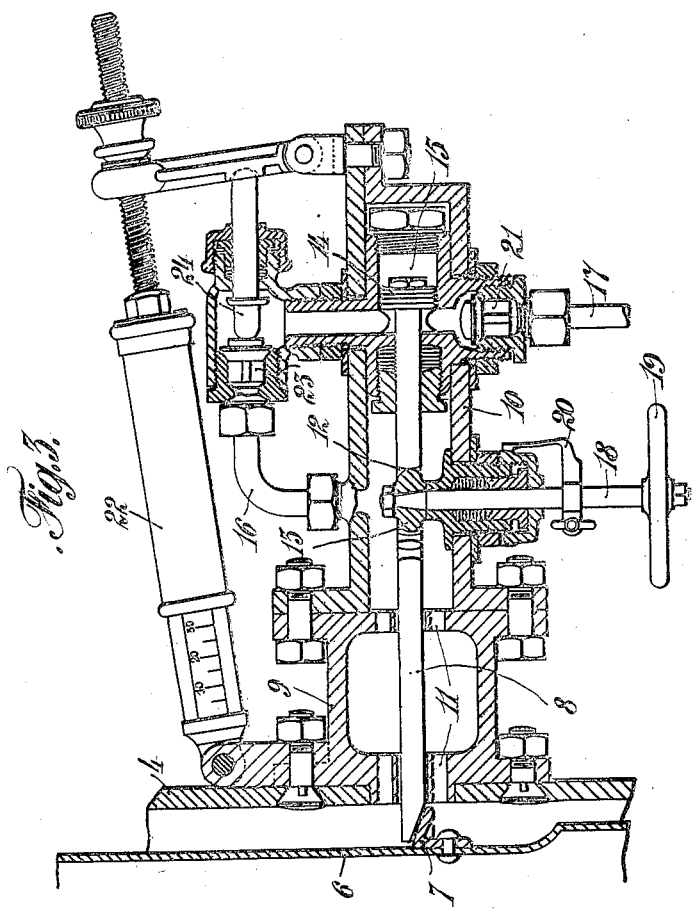

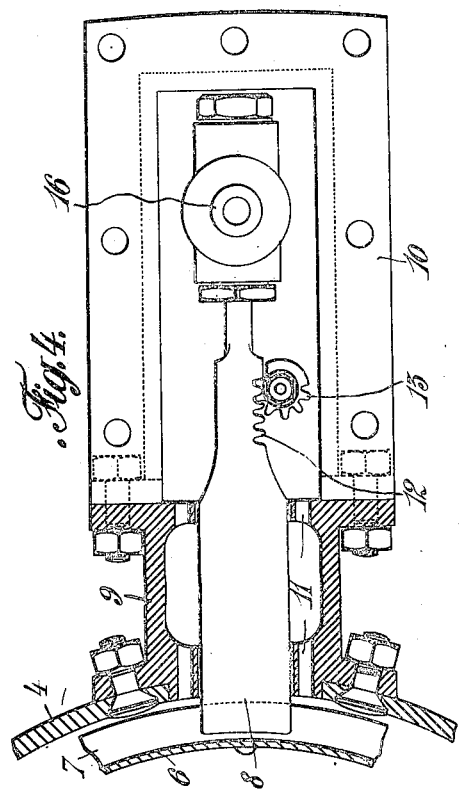

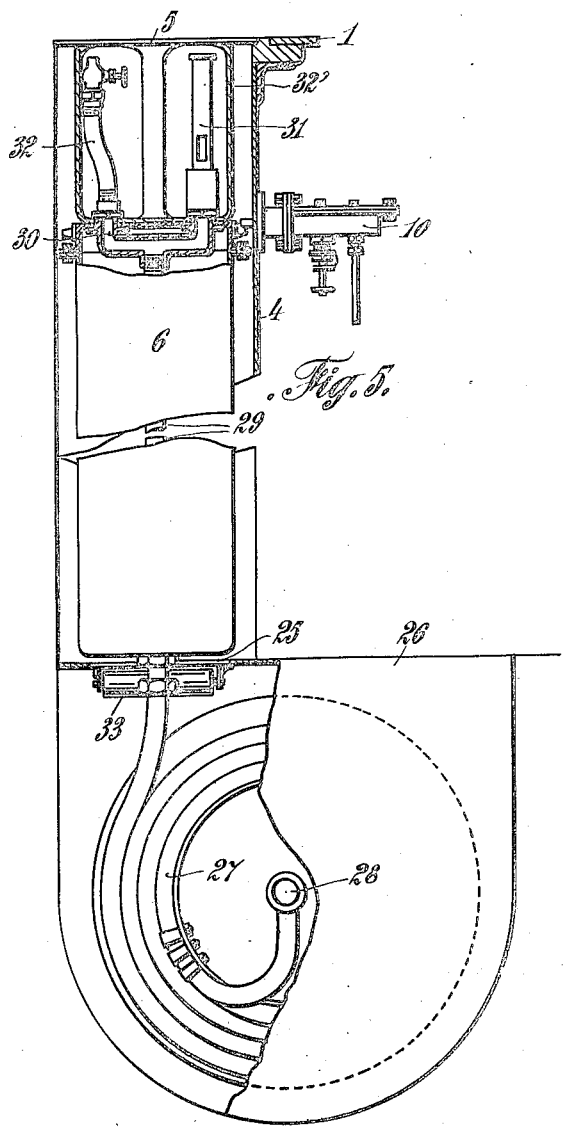

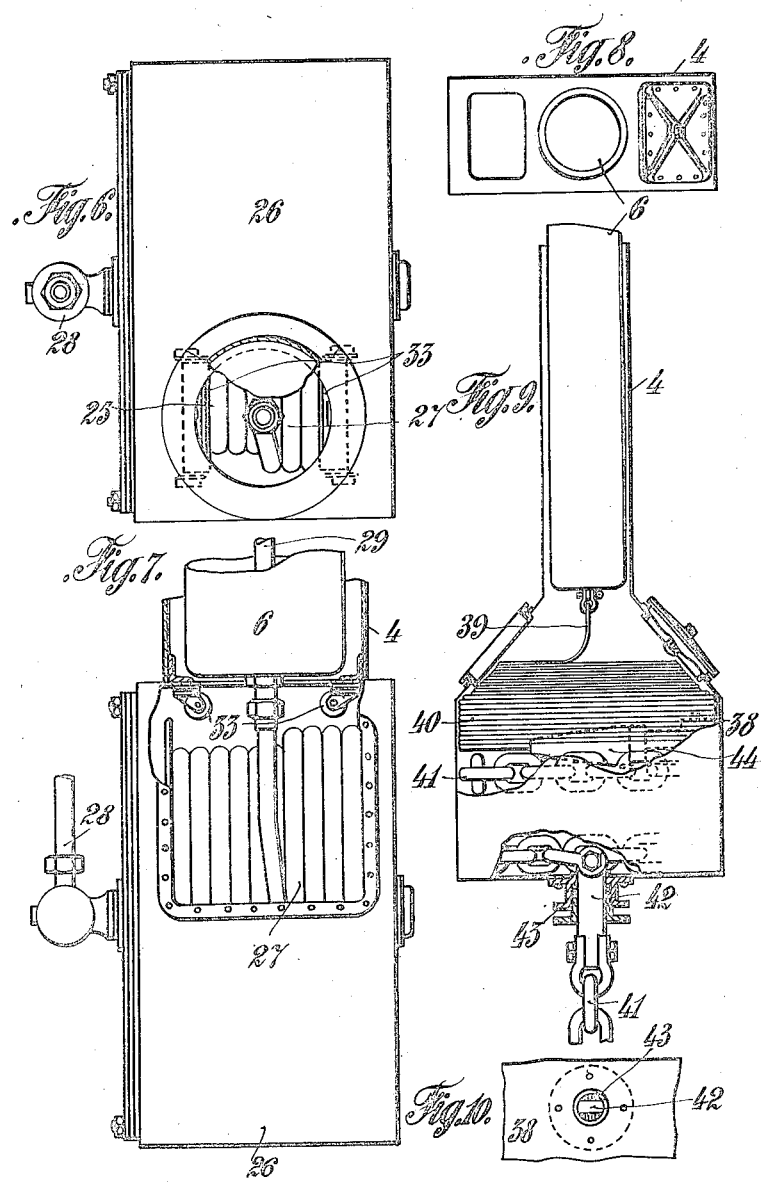

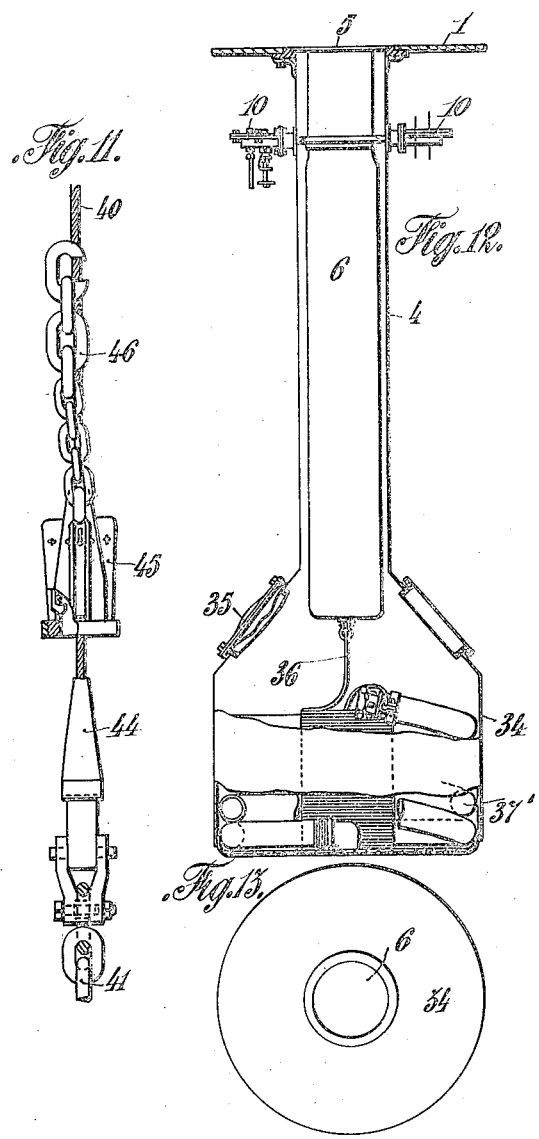

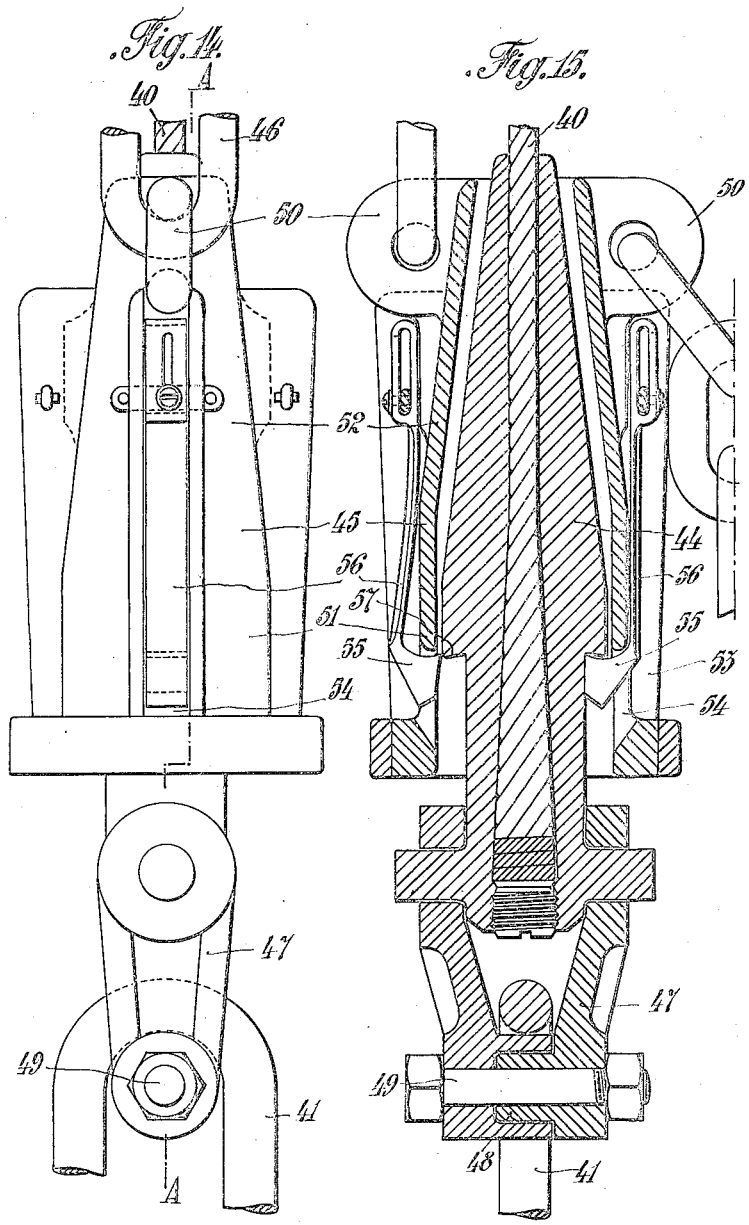

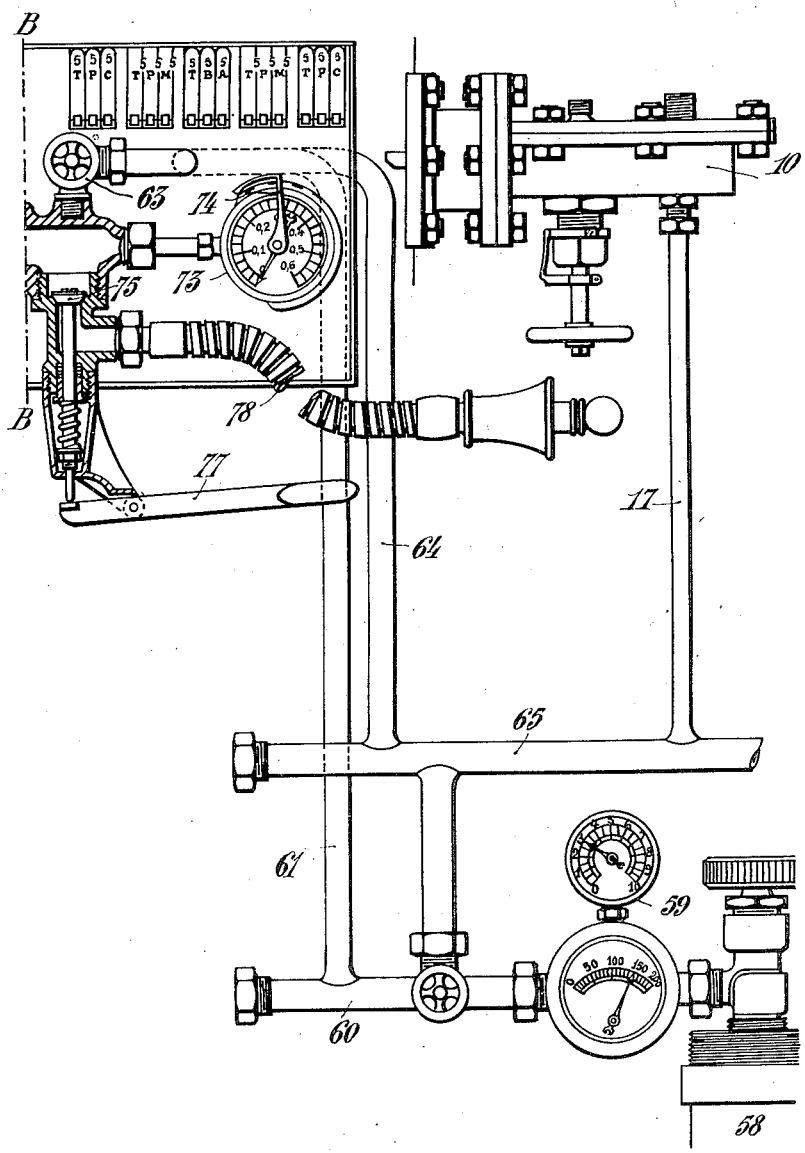

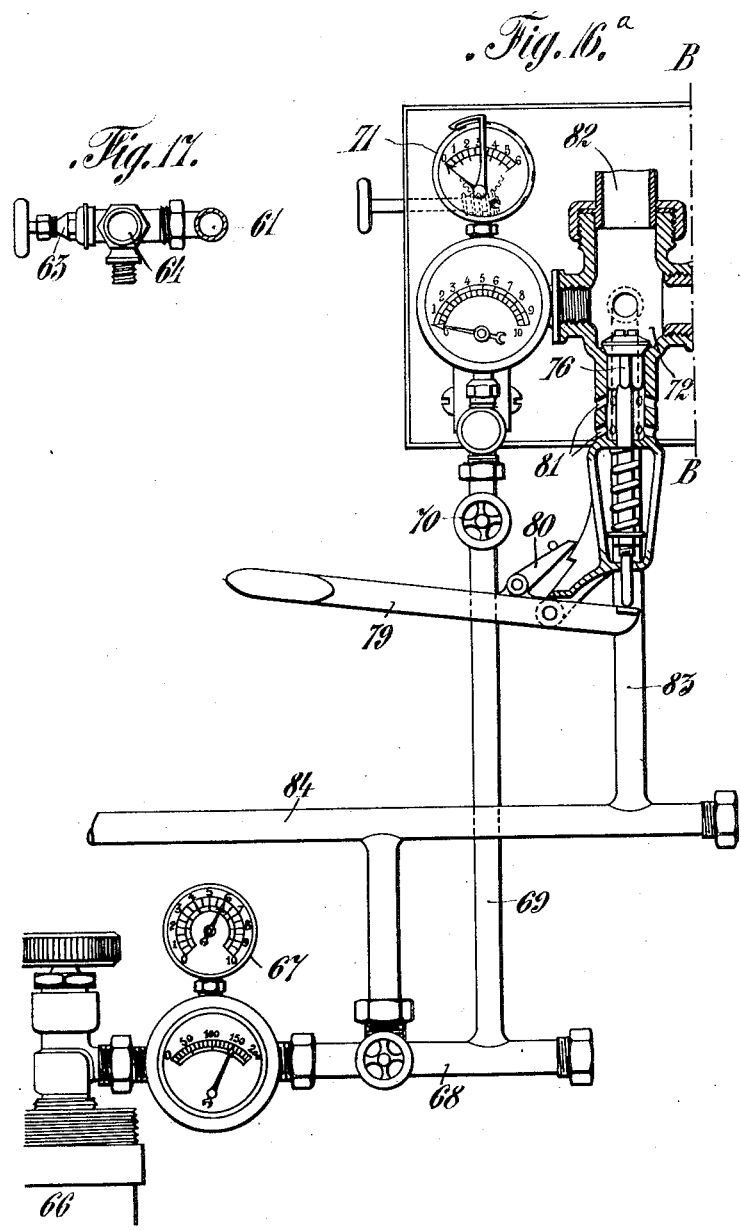

G. SALLES.
BOAT SALVAGE DEVICE.
APPLICATION FILED FEB. 1, 1908.
922,519.
Patented May 25, 1909.
12 SHEETS—SHEET 11.
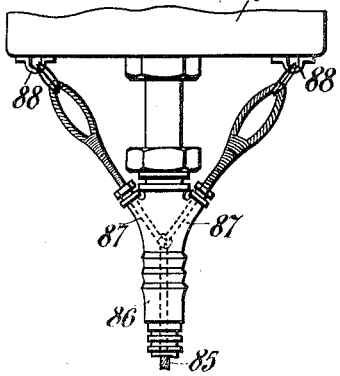
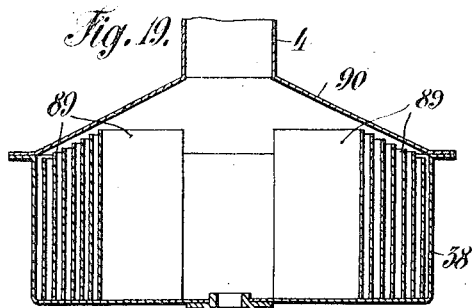
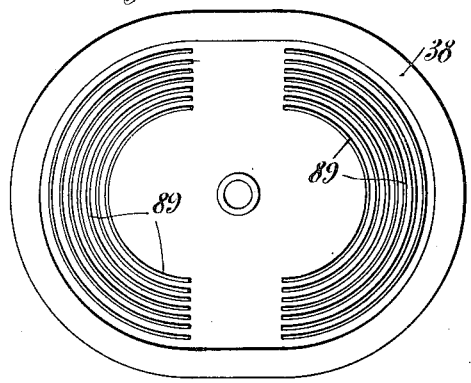
Witnesses
C. M. Boulter
H. K. Boulter
Inventor
Gustave Salles,
By Wm. C. Boulter
Attorney

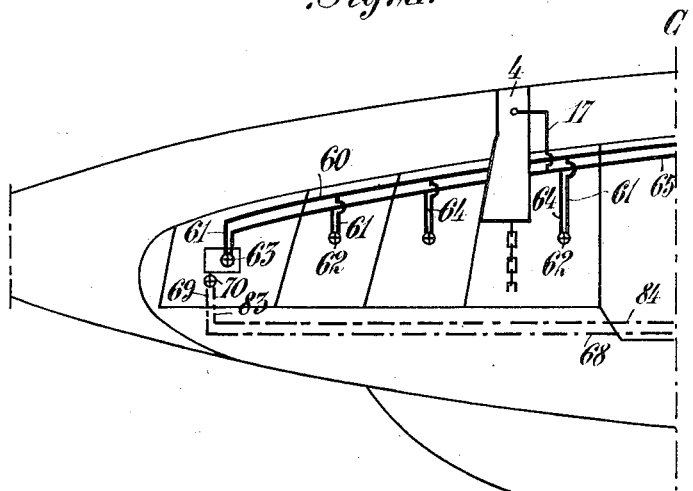
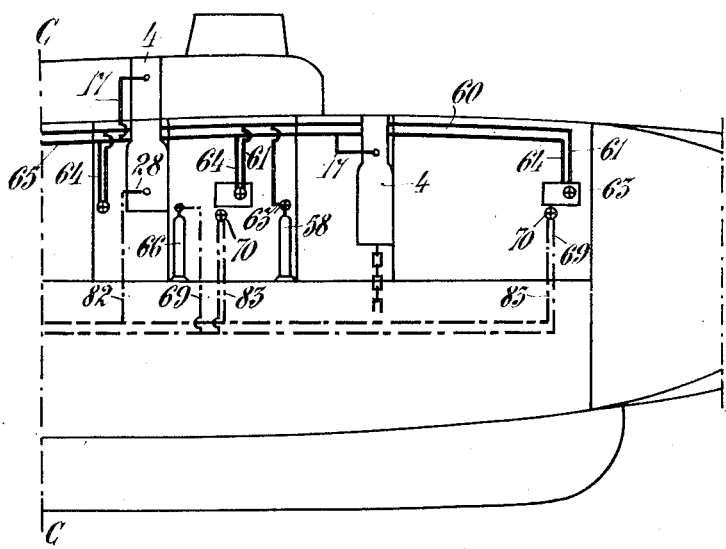

UNITED STATES PATENT OFFICE.

GUSTAVE SALLES, OF BORDEAUX, FRANCE.

BOAT-SALVAGE DEVICE.

No. 922,519.  Specification of Letters Patent.  Patented May 25, 1909.

Application filed February 1, 1908. Serial No. 413,871.

*To all whom it may concern:*

Be it known that I, GUSTAVE SALLES, a citizen of the Republic of France, residing at Bordeaux, France, have invented certain new and useful Improvements in Boat-Salvage Devices, of which the following is a specification.

This invention relates to a salvage device more particularly designed for rendering assistance to submarines and their crews chiefly characterized by the construction of floating buoys arranged in wells provided for the purpose in the superstructure of the boat, intended to come out on the surface of water, dragging with them either tubes intended for establishing verbal or pneumatic communication between the rescuers and the crew, or chains which afterward enable the wreck to be raised, the said buoys being locked in their wells, during the normal working of the boat, until released by the crew, or in the event of the crew being asphyxiated until an apparatus comes into operation for automatically effecting the said release.

In the accompanying drawing:—Figure 1 is a view, partly in elevation and partly in longitudinal section, of the upper portion of a well, of its buoy and of the locking devices. Fig. 2 is a partial view in plan. Fig. 3 is, on an enlarged scale, a longitudinal section of one of the mechanisms for locking the buoys in their wells. Fig. 4 is a corresponding view in plan. Fig. 5 shows the whole of the alarm buoy provided with a Rudolph coil of well known construction. Fig. 6 is a plan of the casing of the said coil. Fig. 7 is a corresponding view in elevation. Fig. 8 is a plan of a well with chains for refloating. Fig. 9 is a corresponding view in vertical section, the well being shown with its buoy. Fig. 10 is a view of the stuffing box of the mooring chain, Fig. 11 is a view of the harpoon bell at the moment where it is about to seize the union cone carrying the mooring chain, Fig. 12 is a vertical section of a well with hose with its buoy. Fig. 13 is a corresponding view in plan. Fig. 14 is, on enlarged scale, an elevation of the harpoon bell. Fig. 15 is a section on line A—A of Fig. 14. Fig. 16 is a view showing one portion only of one of the boards for operating the buoys, and Fig. 16ª is a similar view showing the remaining portion of the same board. Fig. 17 is a plan of one of the operating valves. Fig. 18 shows on an enlarged scale the union piece for connecting the acoustic tube to the buoy. Fig. 19 represents a modification of Fig. 9 with regard to the arrangement of the well which receives the chain and the drag-line. Fig. 20 is a corresponding view in plan. Fig. 21 is a diagrammatic section showing one portion of the whole submarine boat comprising the whole installation of the salvage device, and Fig. 21ª is a similar view of the remaining portion of the boat seen in Fig. 21.

In the deck 1 of the submarine are made openings, the edges of which are stiffened by rings 2 to which are secured angle irons 3, riveted to tubes 4 constituting the lining of the wells for the buoys. The openings in the deck 1 are closed by covers 5 of grooved plate (Fig. 2) and receive the body 6 of the buoy which carries at a given level a collar or hoop 7 having in cross-section the shape of an angle-iron with which the bolts 8 engage for locking the said buoy in position.

To the lining 4 of the wells are bolted brackets 9 to which are secured the boxes 10 of the locking bolts 8 and which are in communication through openings 11 (Fig. 3) with the interior of the wells. In the interior of the boxes 10 are arranged the horizontal bolts or latches 8 resting with their free ends on the hoop 7 of the buoys a portion of the bolt being cut in the shape of a tooth rack 12 operated by the pinion 13, Fig. 4. At the other end the bolt 8 carries a piston 14 working in a cylinder 15 under the action of water arriving through a conduit 16, or of a compressed fluid admitted through a conduit 17. Outside the box 10, the pinion 13 is extended by a pin 18 and a hand wheel 19 enabling the buoy 6 to be locked. The said pin 18 is, moreover, provided with an electric contact 20 traveling on corresponding contact pieces, so that when the bolt 8 is moved back and releases the buoy 6 an alteration in an electric current is produced enabling an operating board to indicate the apparatus which have become operative. On examining Fig. 16, T P C will show, for instance, the buoy of the well with chain, T P M that of the well with hose and T B A that of the alarm buoy.

The locking bolts 8 are operated either by the crew or automatically. To that end, as will be hereinafter described, a suitable compressed fluid, oxygen, carbonic acid or air, is admitted through the pipes 17 in order to raise the valve 21 from its seat, so as to allow the said fluid to act on the piston 14 for withdrawing the locking bolts 8, which results in the buoy 6 being released and rising to the surface of the water. In the event of its being impossible for the crew to work it, whether the crew is asphyxiated or for any other reason, when the boat descends below the maximum depth corresponding to the adjustment of the diving balance 22, the water contained in the well 4 and in the box 10 having a greater pressure than the pressure of the springs of the said balance 22, forces back the valve 23 and its needle 24 and acts on the piston 14 and consequently on the locking bolts 8, so as to release the buoys 6.

In order to effect the salvage, and if possible the refloating of the foundered boat, it is necessary on the one hand, that the boat should signal her presence, and on the other hand that the rescuers should be able to communicate, if possible, with the crew, to send them the air required for breathing, to empty the water contained in the water tight compartments, then, by means of chains to raise the wreck, so as to bring it to the surface, or at least to raise it so as to enable the divers to work at slinging the boat as the said divers cannot descend to excessive depth. To that end, the buoys of the device according to this invention have been designed so as to comply with the above various conditions.

The alarm buoy (Figs. 5-7) is designed so as to signal on rising to the surface, the position of the wrecked boat and to enable a verbal and then a pneumatic communication to be established between the rescuers and the crew.

From the deck 1 extends an inner well, the lining 4 of which is provided with three boxes 10 for locking the buoy. The bottom of the well 4 is bolted above an opening 25 made in a rectangular case 26 intended to receive a Rudolph coil of flexible tube, one end of which communicates with the conduit 28 of a supply pipe for compressed fluid, and the other end is secured to the bottom part of the body of the buoy 6 through which passes, throughout the whole of its height, a vertical pipe 29 forming continuation of the flexible tube. The pipe 29 opens at the top of the buoy 6 into a chamber 30 made in the said pipe, on which are mounted, on the one hand, a siren 31, and on the other hand the union piece 32 to which is connected the pump of the rescuing boat by means of insubmersible discharge pipe. The buoy 6 terminates in supports or brackets 32' supporting the closing plug 5 which fits into an opening made in the upper portion of the well 4 in the deck 1 of the sub-marine. Moreover, rollers 33 are arranged at both sides of the opening 25 for guiding and assisting the unwinding of the tube when the buoy 6 has been released.

The hose carrying buoy 37 makes it possible to discharge water from the water tight compartments (Figs. 12 and 13). The buoy 6 is arranged and locked in a well 4 similar to the well of the alarm buoy, but continuing in a bottom caisson 34 closed by two man hole doors 35. The said buoy 6 carries, secured under it, a coiled up hawser 36 and hose pipe 37' for compressing air and comprises in its upper part a closing plug 5 fitting into the corresponding opening of the deck 1 of the boat.

The well 4 containing the buoy 6 with chains (Fig. 9) does not differ from the preceding one, except by the arrangement of the inner case 38 comprising the coiled up cables or hawsers 39 and 40 and the refloating chains 41. The chain 41 is secured at the bottom to the superstructure of the hull and passes through the bottom of the case 38 by means of a connecting pin 42 freely sliding in a stuffing box 43 which forms a guide for the same. The chain carrying buoy is of exactly the same construction as the preceding ones. It must carry to the surface the first cable 39, to the end of which is attached a second cable 40 of a larger diameter carrying the connecting cone 44 of the harpoon-bell 45 to which is connected the other end of the refloating chain 46.

The connecting cone 44 (Figs. 11-15) is perforated inside for receiving the end of the cable 40 and carries the refloating chain 41 by means of a shackle 47 consisting of two halves connected by means of trunnions 48 by means of a pin 49.

On the cable 40 of the connecting cone 44 which forms a guide for the same, slides a harpoon bell 45 (Figs. 11, 14 and 15) secured by means of its eye-bolts 50 to the raising chains 46 of the rescuing boat. The said bell 45 has the shape of a cylinder 51 extended by a conical part 52 having the same inner shape as the outer shape of the union cone 44 and provided with couples of longitudinal ribs 53 between which are made, at the bottom portion of the bell 45, openings 54 through which pass respectively the heads 55 of latches or pawls 56 arranged between each pair of ribs 53. When the bell 45 is placed on the union cone 44, the heads 55 of bolts or pawls 56 slide on the conical portion of the said cone 44 and come out through the openings 54. Then, on arriving at the straight portion of the cylindrical part of the cone 44 they resume their original position in order to engage under the shoulder 57 of the said cone 44 when the bell 45 is pulled, which insures solidarity of the two portions of chains 41 and 46 belonging one to the wreck boat and the other to the rescuing boat.

For operating the buoys 6 by the crew, there is provided in the boat an installation with several operating posts, for instance, as shown diagrammatically in Fig. 21, there could be arranged in each water tight compartment a handle enabling all the buoys to be operated, and in the commander's cabin, as well as in the fore and aft compartments, general operating or control boards by means of which communication can be established with the rescuers. These boards being identical, only one will be hereinafter described.

In one of the compartments is arranged a tube 58 for a suitable compressed fluid, oxygen, air or carbonic acid, provided with reducing pressure gage 59 bringing the initial pressure of the fluid from 150 atmospheres to, say, three atmospheres. The tube 58 communicates with a general conduit 60 connected to all the posts and having connected to it pipes 61 from ordinary sluice valves 62 or from sluice valves 63 of the operating boards, which valves are connected by pipes 64 to the general distributing conduit 65 passing through the whole of the boat and having branched on it inlet pipes 17 for the devices for locking the buoys 6. In the same compartment is arranged another tube 66, also containing fluid under pressure and also comprising a reducing pressure gage 67 enabling the original pressure of the fluid to be reduced from 150 to 5 or 6 atmospheres. The said pipe communicates with the pipe 68 going through the whole ship and supplying all the general operating boards by means of pipes 69 carrying the valve 70 and the reducing pressure gage 71 which communicates with the interior of the distributer 72 on which is arranged a pressure gage-indicator 73 provided at its circumference with contacts on which slides a contact 74 mounted on the hand of the said indicator-pressure gage and operating a bell.

The distributer 72 is provided at the bottom with two valves 75 76; the valve 75 controlled by the lever 77 enables compressed fluid to be introduced into the acoustic tube 78, and the valve 76 controlled by the lever 79 which can be secured in position by means of a pawl 80, enables the rescuers to force air into the boat through the openings 81. Finally, the pipe 82 establishes communication between the distributer 72 and the Rudolph coil 27 and the siren 31 of the alarm buoy, all the distributers for the different boards being connected together by pipes 83 branched on the general pipe 84.

The method of operating is as follows: Before diving, the valves of the tubes 58 and 66 controlling the locking parts for the buoys and enabling compressed fluid to be supplied to the Rudolph coil and to the alarm buoy, are opened, and then the pressure gages 59 and 67 are regulated so as to charge the pipes. In the event of an accident, one of the valves 62 or 63 is opened in order that the pressure of the fluid should be transmitted through the pipes 64, 65 and 17 to the boxes 10. The bolts 8 will then come out, and the buoys 6, being released, will rise to the surface. The working of the locking bolts 8 will be indicated on the operating boards. For operating the alarm siren 31, the fluid under pressure will be admitted into the distributer 72, and the sound will be produced by operating the hand wheel 70, the fluid under pressure passing through the pipes 68, 69, 83 and 84 in order to arrive through the pipe 28, through the Rudolph coil and then to the vertical pipe 29 of the buoy 6, which opens into the upper chamber 30 on which is mounted the siren 31.

The crew of the rescuing boats on arriving within reach of the buoys 6, will collect the front ones and the back ones corresponding to the chain wells, then will pick up the alarm buoy. The rescuing boat having an air pump with a pressure gage mounted on the tank, an acoustic whistle will be secured to the end of a pipe branched on the said tank, then, on the discharge branch of the pump will be mounted an insubmersible rubber hose which will be secured to the union piece 32 of the buoy, after opening the discharge cock. The pump will then be operated, the descent of the hand of the pressure gage will indicate the possibility of verbal communication with the crew to be saved. During that time, in the submerged boat, at the moment when the discharge cock is opened by the rescuing crew, there being no longer any pressure, the hand of the contact 74 will move and establish contacts to the bell.

By operating the hand wheel of the reducing pressure gage 71, communication between the distributer 72 and the pipe branched on the vessel 66 containing fluid under pressure, will be interrupted. The working of the pump on the surface, owing to the compression of air, will move the hand of the pressure gage, but in the opposite direction, owing to the increase of pressure, and the contact 74 will move again and establish successive contacts, which will result in the bells being operated. These operations will indicate the working of the valve 75 which will be effected by acting on the lever 77 which will result in the working of the whistle of the acoustic pipe 78 giving the signal for verbal conversation with the interior of the wrecked boat, and in the same way the fall of pressure at the pressure gage of the pump of the rescuing crew will indicate the said possibility of communication. It will then be possible by acting on the lever 79 held in fixed position by the pawl 80, to enable air or oxygen to be forced into the boat through the valve 76 and orifices 81. The buoys 6 and their cables will then be hauled on board the rescuing decks. The cable 39 secured to the chain buoy, will be disconnected in order to enable the hawser 30 to pass through the harpoon bell 45, the said hawser being tightened by the winch so as to haul out of the well of the submarine the union cone 44 and the refloating chain 41. The chain 46 will then be paid out with the bell until the depth indicated, in order that it should seize the union cone 44, at which moment a connection will be made between the two pieces of chain 41 of the submerged boat and 46 of the rescuing boat. The other buoys and cables securely attached will have to be hauled on board in order to bring to the surface hose unions 37 and to connect them to those of the pumps for pumping out water, which will render easier the hoisting for the winches of the docks.

In order to prevent an excessive strain on the flexible pipe of the Rudolph coil 27 at the moment of its securing to the buoy or in case of heavy sea, it is preferable to arrange in the interior of the said pipe a cable 85 which will be wound with it on the hoisting drum. The flexible pipe or hose is soldered to a union piece 86, and the cable divided in the interior of the said union piece into two strands engaging respectively with two lateral extensions 87 for passing through the stuffing box and being secured to the bottom portion of the buoy on the rings or eyes 88 arranged for the purpose. Finally, for enabling the cables to be coiled and to facilitate their winding without formation of kinks or knots, there are arranged in the caisson 38 contained in the bottom portion of the chain well, concentric circular partitions 89 between which engages successively the portion or strand of the cable to be coiled. The cover 90 of the caisson joining the latter at the lining 4 of the well, has a conical shape, and the concentric partitions 89 are of decreasing height, so that there remains between them and the wall of the said cover, a uniform space equal to the distance of two consecutive partitions and to the diameter of the cable. It follows therefrom that the cable in being uncoiled, passes between the partitions 89 and the cover 90 folding down the successive rows which might have the tendency to come out of their place, without any knots or kinks being formed, the coiled strand being perfectly guided between the wall of the cover and the edge of the successive partitions. The piece of chain 41 which is secured to the cable, would be coiled in the central space of the caisson 38, left between the two inner partitions.

What I claim as my invention and desire to secure by Letters Patent is:—

1. In a salvage device for boats the combination of a well arranged in the hull of a boat, a buoy located in the well, a flexible connection between the boat and the buoy, a locking bolt adapted to engage at one end with the buoy, a piston connected to the other end of said bolt, a cylinder surrounding said piston, and a diving balance which, normally, prevents the admission of outside water to the cylinder, but which under a predetermined pressure automatically allows the water to reach the piston whereby the bolt is withdrawn and the buoy released.

2. In a salvage device for boats the combination of a plurality of wells arranged in the hull of a boat, a buoy located in each well, a bolt to keep each buoy in its well, a piston connected to each bolt, a cylinder for each piston, a network of pipes connecting the cylinders, a diving balance for each cylinder to control the admission of outside water thereto, and means to admit at will, fluid under pressure to the network of pipes, whereby the bolts can be released automatically, by the diving balances or at will of the crew by the admission of pressure fluid to the network of pipes.

3. In a salvage device for boats the combination of a plurality of wells in the hull of a boat, a buoy in each well, flexible connections between the boat and each buoy, locking bolts for keeping each buoy in its well, a pinion to engage with each bolt and adapted to be manually actuated, means for operating each pinion, a recording board and means for indicating on the recording board, the location of the well from which the buoy has been released.

In testimony whereof I have signed my name to this specification in the presence of two subscribing witnesses.

GUSTAVE SALLES.

Witnesses:
 ALBERT PHILLIPS,
 HENRY PHILLIPS.